US010253647B2

United States Patent
Domnick et al.

(10) Patent No.: US 10,253,647 B2
(45) Date of Patent: Apr. 9, 2019

(54) REGULATING VALVE AND TURBINE

(71) Applicant: Siemens Aktiengesellschaft, Munich (DE)

(72) Inventors: Bernhard Clemens Domnick, Hünxe (DE); Friedrich-Karl Benra, Duisburg (DE); Christian Musch, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/538,848

(22) PCT Filed: Jan. 5, 2016

(86) PCT No.: PCT/EP2016/050055
§ 371 (c)(1),
(2) Date: Jun. 22, 2017

(87) PCT Pub. No.: WO2016/113147
PCT Pub. Date: Jul. 21, 2016

(65) Prior Publication Data
US 2017/0356300 A1 Dec. 14, 2017

(30) Foreign Application Priority Data
Jan. 14, 2015 (EP) ..................... 15151066

(51) Int. Cl.
*F16K 47/04* (2006.01)
*F01D 17/14* (2006.01)
*F16K 47/08* (2006.01)

(52) U.S. Cl.
CPC ......... *F01D 17/145* (2013.01); *F01D 17/141* (2013.01); *F16K 47/08* (2013.01)

(58) Field of Classification Search
CPC ....... F01D 17/145; F01D 17/141; F16K 47/08
(Continued)

(56) References Cited

U.S. PATENT DOCUMENTS 952,187 A * 3/1910 Donelly ............. F16K 47/02
251/120
982,981 A * 1/1911 Mueller ............. F16K 47/02
251/120
(Continued)

FOREIGN PATENT DOCUMENTS

GB 1223983 A 3/1971
JP S5157558 A 5/1976
(Continued)

OTHER PUBLICATIONS

EP Search Report dated Jun. 29, 2015, for EP patent application No. 15151066.6.
(Continued)

*Primary Examiner* — Minh Q Le
(74) *Attorney, Agent, or Firm* — Beusse Wolter Sanks & Maire

(57) ABSTRACT

A control valve for controlling a gaseous volumetric flow rate, in particular a steam volumetric flow rate, having a valve housing, a valve seat, and a valve throttle element which can be moved relative to the valve seat along a movement axis. The valve housing shapes the valve seat, and the movable valve throttle element has a throttle edge region which interacts with the valve seat. The control valve has multiple volumetric flow rate swirl elements which interact with the throttle edge region and which prevent or at least reduce shear layer instabilities in a shear layer between a wall jet region of the gaseous volumetric flow rate and a core flow region of the gaseous volumetric flow rate.

14 Claims, 2 Drawing Sheets

(58) Field of Classification Search
USPC ............... 137/489, 625.33, 625.28, 625.3; 251/120, 118, 121, 122, 210
See application file for complete search history.

(56) References Cited

U.S. PATENT DOCUMENTS

| | | | | |
|---|---|---|---|---|
| 1,208,590 | A * | 12/1916 | Lilly | F16K 3/26 251/325 |
| 1,359,522 | A * | 11/1920 | Mueller | F16K 31/52 251/158 |
| 1,437,750 | A * | 12/1922 | Ehemann | F16K 25/04 137/630.22 |
| 2,649,273 | A * | 8/1953 | Honegger | F16K 1/42 251/118 |
| 2,659,388 | A * | 11/1953 | Rand | F16K 3/28 251/120 |
| 3,857,542 | A * | 12/1974 | Heymann | F01D 17/145 137/625.33 |
| 4,375,939 | A * | 3/1983 | Mount | F04D 29/462 138/43 |
| 4,892,118 | A * | 1/1990 | Davis | F01D 17/145 137/625.3 |
| 4,986,309 | A * | 1/1991 | Bellanca | F01D 17/145 137/630.14 |
| 5,150,736 | A | 9/1992 | Vincent de Paul et al. | |
| 5,318,270 | A * | 6/1994 | Detanne | F01D 17/145 137/625.33 |
| 6,053,204 | A * | 4/2000 | Matusyak | F16K 3/08 137/625.31 |
| 6,082,405 | A * | 7/2000 | Qvarfordh | F16K 1/54 137/625.33 |
| 6,260,530 | B1 * | 7/2001 | Keon, Jr. | F01L 3/06 123/188.8 |
| 8,220,775 | B2 * | 7/2012 | Bittner | F16K 3/246 251/121 |
| 8,522,820 | B2 * | 9/2013 | Biwanski | F16K 47/08 137/625.3 |
| 8,998,169 | B2 * | 4/2015 | Kaegi | F15C 1/16 137/808 |
| 9,347,336 | B2 * | 5/2016 | Ito | F01D 25/24 |

FOREIGN PATENT DOCUMENTS

| | | |
|---|---|---|
| JP | H04254086 A | 9/1992 |
| JP | 2008175267 A | 7/2008 |
| SU | 1820116 A1 | 6/1993 |

OTHER PUBLICATIONS

International Search Report dated Mar. 30, 2016, for PCT/EP2016/050055.
RU search report dated Jul. 17, 2018, for corresponding RU patent application No. 2017128536/06.

* cited by examiner

REGULATING VALVE AND TURBINE

CROSS REFERENCE TO RELATED APPLICATIONS

This application is the US National Stage of International Application No. PCT/EP2016/050055 filed Jan. 5, 2016, and claims the benefit thereof. The International Application claims the benefit of European Application No. EP15151066 filed Jan. 14, 2015. All of the applications are incorporated by reference herein in their entirety.

FIELD OF INVENTION

The invention relates to a regulating valve for regulating a gaseous volume flow, in particular a steam volume flow, having a valve housing, having a valve seat and having a valve throttle element which is displaceable along a displacement axis relative to the valve seat, in which valve the valve housing forms the valve seat and in which valve the displaceable valve throttle element has a throttle edge region which interacts with the valve seat.

The invention furthermore relates to a turbine, in particular a steam turbine, having a multiplicity of valve devices.

BACKGROUND OF INVENTION

Regulating valves of the generic type are known in particular at steam turbines. If such regulating valves are operated for example in a throttled operating state, that is to say in a not fully open or closed operating state of the regulating valve, a characteristic flow pattern, which is substantially characterized by the formation of a wall-jet region with flow speeds which are considerably higher than the flow speeds of a core-flow region of a volume flow, virtually always forms in a flow interior space of the regulating valve.

In this respect, the differing flow speeds give rise to a shear layer between the wall-jet region of the volume flow flowing through the regulating valve and the core-flow region of this volume flow, with often non-negligible, high speed gradients.

It is known both from experimental and from numerical studies of the flow behavior at such regulating valves that, in the shear layer, flow instabilities can occur which can give rise to critical resonance effects in the flow space of the regulating valve. In the worst case, this can lead to an excitation of the regulating valve structure of such an undesirable nature that it is capable of bringing about damage to said regulating valve structure.

In order to counteract said resonance effects, it is known to provide flow straighteners in the region of the valve seat on the valve housing, which straighteners can contribute to a positive influence on the shear layer. However, said fixtures in the form of flow straighteners lead nearly always to considerable flow losses, as a result of which the total power of the turbine or steam turbine is lowered.

U.S. Pat. No. 5,150,736 discloses a valve which has a cylindrical valve shut-off member and an annular valve seat.

SUMMARY OF INVENTION

It is an object of the invention to further develop regulating valves of the generic type.

This object is achieved by the features of the independent patent claims.

This object is achieved by a regulating valve for regulating a gaseous volume flow, in particular a steam volume flow, having a valve housing, having a valve seat and having a valve throttle element which is displaceable along a displacement axis relative to the valve seat, in which valve the valve housing forms the valve seat and in which valve the displaceable valve throttle element has a throttle edge region which interacts with the valve seat, wherein the regulating valve has a plurality of volume-flow swirl elements which interact with the throttle edge region and which prevent or at least reduce shear-layer instabilities in a shear layer between a wall-jet region of the gaseous volume flow and a core-flow region of the gaseous volume flow.

The volume-flow swirl elements which interact with the throttle edge region make it possible to manipulate or positively influence the shear layer between a wall-jet region of the gaseous volume flow and a core-flow region of the gaseous volume flow to the effect that critical instabilities in the region of the shear layer of the gaseous volume flow are reduced or prevented.

In particular here, the shear layer is mixed significantly better.

As a result, it is possible in a structurally very simple manner for undesirable resonance effects at the regulating valve to be prevented, or at least dampened such that, in particular, impairment of the regulating valve structure can be prevented.

Mixing of the shear layer can be improved further if the volume-flow swirl elements are at least in part of different length in the circumferential direction.

The present regulating valve can have a wide variety of designs, provided that it can serve for shutting off or at least throttling a gaseous volume flow.

With regard to a preferred application area at a steam turbine, it is provided that the gaseous volume flow is a steam volume flow.

The object of the invention is therefore also achieved by a turbine, in particular a steam turbine, having a multiplicity of valve devices, wherein at least one of the valve devices comprises a regulating valve according to one of the features described herein.

Advantageously, the degree of efficiency of the turbine, in particular of the steam turbine, is significantly increased if at least the relevant valve devices of the turbine or of the steam turbine have a regulating valve formed in the context of the invention.

The volume-flow swirl elements acting in the gaseous volume flow as interference bodies can be arranged here, for example, on the valve housing, just in front of—as viewed in the flow direction—the throttle edge region.

In order to keep flow losses in the regulating valve as low as possible, the height of said volume-flow swirl elements projecting above the inner side of the valve housing should be formed to be as small as possible.

Since a critical shear layer substantially forms only in a throttled operating state of the regulating valve, a height limitation of the volume-flow swirl elements has no or only a negligible influence on their effectiveness.

Moreover, the pressure losses at the regulating valve can be kept at a tolerable or at a negligible level.

If the volume-flow swirl elements are arranged on the valve housing concentrically around the displacement axis and opposite the throttle edge region, the shear layer can be manipulated circumferentially in a particularly effective manner. Swirl elements can also be arranged asymmetrically in the circumferential direction.

Cumulatively or alternatively, it is advantageous if the volume-flow swirl elements are arranged on the throttle edge region of the displaceable valve throttle element concentrically around the displacement axis. Even with volume-flow swirl elements integrated directly in the throttle edge region, the advantageous effects of the invention can be realized.

It is clear that the volume-flow swirl elements can be arranged concentrically around the displacement axis in virtually any desired manner, in particular in an evenly distributed manner. Here, it is unimportant whether the volume-flow swirl elements are arranged on the valve seat or on the throttle edge region.

The effects concerning the shear layer, in particular the mixing of the shear layer, can be particularly well pronounced if the throttle edge region of the displaceable valve throttle element is formed asymmetrically on a side facing the valve seat.

In this respect, it is advantageous if the throttle edge region of the displaceable valve throttle element is formed asymmetrically in the circumferential direction of said region. This too allows the mixing of the shear layer to be influenced very effectively.

A change in the geometry of the throttle edge region enables a positive influence on, in particular improved mixing of, the shear layer to be realized.

It is clear that the volume-flow swirl elements can be realized in a wide variety of ways.

Said elements can be realized in a structurally very simple manner if the throttle edge region of the displaceable valve throttle element has material recesses and/or material webs.

Said material recesses and/or the material accumulations can act particularly effectively, especially in the throttled state of the regulating valve, if the material recesses and/or the material webs face the valve seat.

The effects concerning the shear layer can be particularly well pronounced if the material recesses and/or the material webs are arranged on the valve throttle element in an unevenly distributed manner in the circumferential direction of the throttle edge region.

Mixing of the shear layer can be further improved if the material recesses and/or the material webs are at least in part of different length in the circumferential direction.

With regard to a particularly advantageous refinement of the invention, the throttle edge region of the displaceable valve throttle element may have a serrated crown shape on a side facing the valve seat.

The teeth of the crown shape can be realized in a structurally simple manner by way of an interplay between the material recesses and material webs extending in the circumferential direction.

In this respect, the crown shape can be formed asymmetrically or symmetrically, so that an evenly or an unevenly configured crown shape can be provided.

Further features, effects and advantages of the present invention will be explained on the basis of the accompanying drawings and the following description which illustrate and describe by way of example a regulating valve and differently configured throttle edge regions of valve throttle elements which again are shown by way of example.

DETAILED DESCRIPTION OF INVENTION

Figure 1:
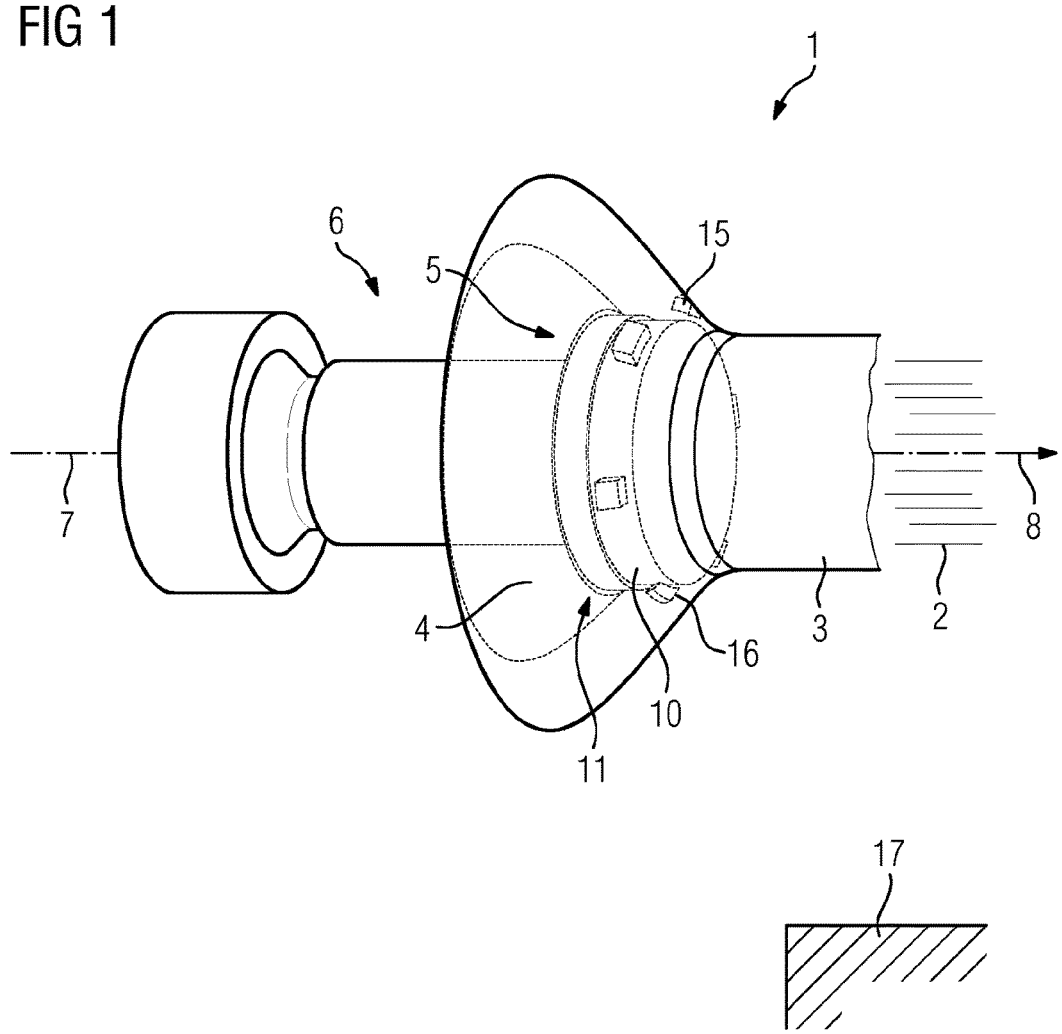
FIG. 1 diagrammatically shows a model view of a regulating valve for regulating a steam volume flow, having a multiplicity of volume-flow swirl elements which interact with the throttle edge region and which prevent shear-layer instabilities in a shear layer between a wall-jet region of the gaseous volume flow and a core-flow region of the gaseous volume flow.

The regulating valve 1 shown in FIG. 1 for regulating or at least for throttling especially a steam volume flow 2 has a valve housing 3 which has a flow interior space 4, on the inner side (not separately numbered) of which housing a conical valve seat 5 is configured.

In the valve housing 3, there is arranged a valve throttle element 6 which is displaceable relative to the valve seat 5, wherein said valve throttle element 6 is displaceable along a displacement axis 7.

Here, the steam volume flow 2 flows through the regulating valve 1 in the through-flow direction 8.

The valve throttle element 6 has a throttle edge region 10 which is able to interact more strongly with the valve seat 5 introduced in the valve housing 3 the closer to the valve seat 5 the valve throttle element 6 is moved. This applies in particular if the regulating valve 1 is run in a throttled operating state in which the valve throttle element 6 is arranged spaced apart from the valve seat 5 with only a relatively small gap in comparison with an open operating state of the regulating valve 1.

The throttle edge region 10 is at least in part formed in a conical or toroidal manner, such that it is compatible with the conical valve seat 5.

Here, the throttle edge region 10 extends around the displacement axis 7 in an annular manner.

Furthermore, the throttle edge region 10 is distinctly formed on one end 11, facing the valve seat 5, of the throttle valve element 6.

In order to prevent or at least to reduce shear-layer instabilities, the regulating valve 1 has a multiplicity of volume-flow swirl elements 15 (numbered merely by way of example) which interact with the throttle edge region 10 and by means of which significantly improved mixing of the shear layer (not shown) is realized, such that speed gradients between a wall-jet region (not shown) of the steam volume flow 2 and a core-flow region (not shown) of the steam volume flow 2 can be avoided or at least reduced.

In the exemplary embodiment shown in FIG. 1, the volume-flow swirl elements 15 are arranged on the valve housing 3 concentrically around the displacement axis 7 and opposite the throttle edge region 10.

Here, the volume-flow swirl elements 15 are formed on the valve housing 3 as material accumulations 16 which are distinctly formed on the valve seat 5.

The regulating valve 1 shown in FIG. 1 is used as a throttle valve in a valve device of a steam turbine 17 (not further shown here).

Figure 2:
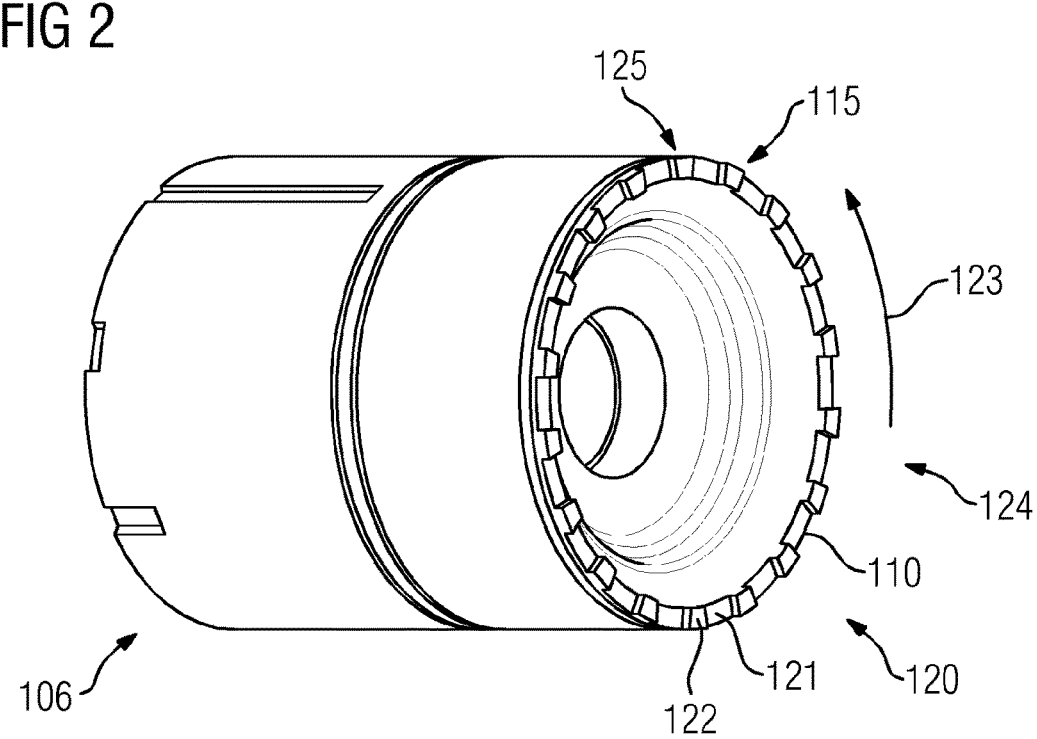
FIG. 2 diagrammatically shows a perspective view of another valve throttle element, having a plurality of volume-flow swirl elements which are arranged symmetrically in the circumferential direction on a throttle edge region.

In the case of the other valve throttle element 106 shown in FIG. 2, which may be a component of a similar regulating valve 1 as shown in FIG. 1, wherein the regulating valve associated with the other valve throttle element 106 is not shown.

The valve throttle element 106 has an at least in part conically configured throttle edge region 110 which is formed symmetrically on a side 120 facing the valve seat 5 (see FIG. 1 by way of example).

On the throttle edge region 110 of the valve throttle element 106 there is arranged a multiplicity of volume-flow swirl elements 115 which, in said exemplary embodiment, are distinctly formed as material recesses 121 on the throttle edge region 110.

The material recesses 121 also lead to material webs 122 on the throttle edge region 110, wherein in each case two material webs 122 laterally delimit a material recess 121 in the circumferential direction 123 of the throttle edge region 110, and vice versa.

Said material recesses 121 are introduced as pocket regions into the throttle edge region 110 and they prevent shear-layer instabilities in a shear layer between a wall-jet region of the steam volume flow and a core-flow region of the steam volume flow.

The material recesses 121 or the material webs 122 are arranged on the valve throttle element 106 in an evenly distributed manner in the circumferential direction 123 of the throttle edge region 110.

In any case, the throttle edge region 110 of the displaceable valve throttle element 106 is realized in the form of a serrated crown shape 125 on the side 124 of said region facing the valve seat 5, wherein the teeth are formed by the material webs 122.

By means of the valve throttle element 106 formed in said manner, shear-layer instabilities in a shear layer between a wall-jet region of the steam volume flow 2 (see FIG. 1 by way of example) and a core-flow region of the steam volume flow 2 can be prevented cumulatively or alternatively.

Figure 3:
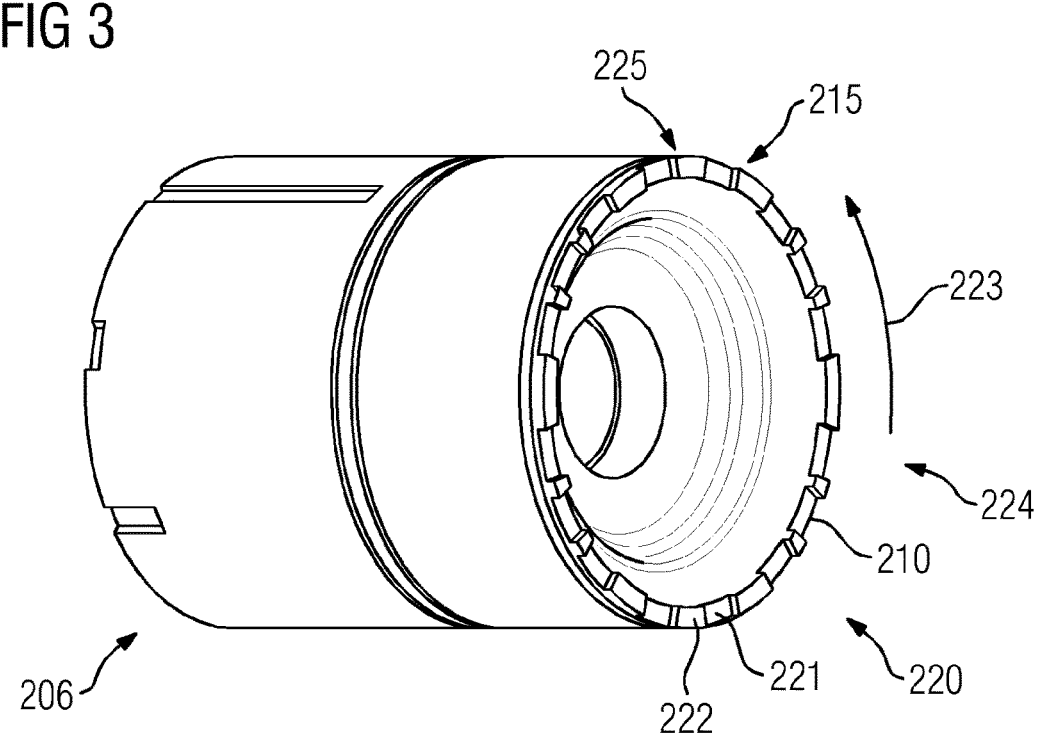
FIG. 3 diagrammatically shows a perspective view of a further valve throttle element, having a plurality of volume-flow swirl elements which are arranged asymmetrically in the circumferential direction on a throttle edge region.

In the further valve throttle element 206 shown in FIG. 3, which is approximately structurally identical to the other valve throttle element 106 shown in FIG. 2, the material recesses 221 or material webs 222 provided on the throttle edge region 210 are arranged on the valve throttle element 206 in an unevenly distributed manner in the circumferential direction 223 of the throttle edge region 210, whereby the effects with regard to the prevention of shear-layer instabilities in a shear layer between a wall-jet region of the steam volume flow 2 (see FIG. 1 by way of example) and a core-flow region of the steam volume flow 2 can be further intensified.

The formed-in material recesses 221 on the throttle edge region 210 and, in this respect, also the material webs 222 corresponding to said recesses are of different length in the circumferential direction 223 of the throttle edge region 210.

Said further valve throttle element 206 can also be a component of a similar regulating valve 1 as shown in FIG. 1, wherein the regulating valve associated with the other valve throttle element 206 is also not shown.

The valve throttle element 206 thus has an at least in part conically configured throttle edge region 210 which is, however, formed asymmetrically on a side 224 facing the valve seat 5 (see FIG. 1 by way of example).

In this respect, on the throttle edge region 210 of the valve throttle element 206 there is likewise provided a multiplicity of volume-flow swirl elements 215 which, in the exemplary embodiment shown in FIG. 3, are distinctly formed as material recesses 221 in the shape of pocket regions on the throttle edge region 210.

The material recesses 221 or the material webs 222 are arranged on the valve throttle element 206 in an unevenly distributed manner in the circumferential direction 223 of the throttle edge region 210.

Also, the throttle edge region 210 of the displaceable valve throttle element 206 is realized in the form of a serrated crown shape 225 on the side 224 of said region facing the valve seat 5.

Although the invention has been more specifically illustrated and described in detail by the preferred exemplary embodiment, the invention is not limited by the exemplary embodiment disclosed and other variations can be derived herefrom by a person skilled in the art, without departing from the protective scope of the invention.

The invention claimed is:

1. A regulating valve for regulating a gaseous volume flow, comprising:
   a valve housing that forms a valve seat, and
   a displaceable valve throttle element which is displaceable along a displacement axis relative to the valve seat and which comprises a throttle edge region which interacts with the valve seat,
   wherein the regulating valve comprises a plurality of volume-flow swirl elements which interact with the throttle edge region and which prevent or at least reduce shear-layer instabilities in a shear layer between a wall-jet region of a gaseous volume flow and a core-flow region of the gaseous volume flow, characterized in that the throttle edge region of the displaceable valve throttle element comprises circumferentially arranged material recesses with material webs therebetween, wherein a circumferential length of a material recess of the material recesses is different than a circumferential length of a material web of the material webs, and
   wherein the material webs are unevenly circumferentially distributed.

2. The regulating valve as claimed in claim 1, wherein the plurality of volume-flow swirl elements are arranged on the throttle edge region of the displaceable valve throttle element concentrically around the displacement axis.

3. The regulating valve as claimed in claim 1, wherein the throttle edge region of the displaceable valve throttle element is formed asymmetrically on a side facing the valve seat.

4. The regulating valve as claimed in claim 1, wherein the throttle edge region of the displaceable valve throttle element is formed asymmetrically circumferentially.

5. The regulating valve as claimed in claim 1, wherein the material recesses and/or the material webs face the valve seat.

6. The regulating valve as claimed in claim 1, wherein the throttle edge region of the displaceable valve throttle element comprises a serrated crown shape on a side facing the valve seat.

7. The regulating valve as claimed in claim 1, wherein the gaseous volume flow is a steam volume flow.

8. A turbine comprising
   a multiplicity of valve devices,
   wherein at least one of valve device of the multiplicity of valve devices comprises a regulating valve as claimed in claim 1.

9. The turbine as claimed in claim 8, wherein the turbine is a steam turbine.

10. A regulating valve, comprising:
    a valve housing that forms a valve seat;
    a valve throttle element which is displaceable along a longitudinal axis relative to the valve seat and which comprises a throttle edge region, a plurality of swirl elements disposed on the throttle edge region or on the valve seat and configured to guide a flow of steam flowing between the throttle edge region and the valve seat;

wherein swirl elements of the plurality of swirl elements are unevenly circumferentially distributed about the longitudinal axis, and wherein adjacent swirl elements form a respective flow path therebetween, and wherein adjacent flow paths comprise same flow path heights.

11. The regulating valve of claim 10, wherein the swirl elements comprise various circumferential lengths.

12. The regulating valve of claim 10, wherein the swirl elements are disposed on the throttle edge region.

13. The regulating valve of claim 10, wherein the swirl elements are disposed on the valve seat.

14. A regulating valve, comprising:

a valve housing that forms a valve seat;

a valve throttle element which is displaceable along a longitudinal axis relative to the valve seat and which comprises a throttle edge region, a plurality of swirl elements disposed on the throttle edge region or on the valve seat and configured to guide a flow of steam flowing between the throttle edge region and the valve seat;

wherein swirl elements of the plurality of swirl elements are unevenly circumferentially distributed about the longitudinal axis, and wherein recesses between adjacent swirl elements comprise various circumferential lengths.

* * * * *